| United States Patent [19] | [11] | 4,126,602 |
|---|---|---|
| Salee | [45] | Nov. 21, 1978 |

[54] AROMATIC POLYESTERS HAVING IMPROVED PROPERTIES

[75] Inventor: Gideon Salee, Williamsville, N.Y.

[73] Assignee: Hooker Chemicals & Plastics Corp., Niagara Falls, N.Y.

[21] Appl. No.: 863,553

[22] Filed: Dec. 22, 1977

[51] Int. Cl.² ............................................. C08L 67/06
[52] U.S. Cl. ................................. 260/40 R; 260/873;
528/173; 528/191; 528/194; 528/195; 528/176
[58] Field of Search ............................ 260/873, 40 R

[56] References Cited

U.S. PATENT DOCUMENTS

| 3,216,970 | 11/1965 | Conix | 260/47 C |
|---|---|---|---|
| 3,471,441 | 10/1969 | Hindersinn | 260/47 C |
| 3,919,354 | 11/1975 | Moore | 260/880 R |
| 3,966,842 | 6/1976 | Ludwig | 260/873 |
| 4,051,106 | 9/1977 | Gouinlock | 260/47 C |
| 4,051,107 | 9/1977 | Pawlak | 260/860 |

*Primary Examiner*—Paul Lieberman
*Attorney, Agent, or Firm*—Peter F. Casella; James F. Mudd; William G. Gosz

[57] ABSTRACT

Aromatic polyester compositions having improved hydrolytic stability comprise, in admixture, (1) a linear aromatic polyester prepared from an aromatic dicarboxylic acid and a bisphenol, and (2) a polymer comprising the reaction product of a styrene/maleic anhydride copolymer and a diene rubber.

16 Claims, No Drawings

AROMATIC POLYESTERS HAVING IMPROVED PROPERTIES

BACKGROUND OF THE INVENTION

Linear aromatic polyesters prepared from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding apparatus (i.e. less than about 300° C.). This type of glycol-modified polyester is more fully disclosed in U.S. Pat. No. 3,471,441, to Hindersinn.

In order to form a successful molding resin on a commercial scale, a polymer should be capable of being molded conveniently without significant degradation in physical properties. In this respect, although the aforementioned aromatic polyesters generally display excellent physical and chemical properties, a persistant problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would limit their commercial utility in applications such as in autoclaves or at elevated temperatures in humid atmospheres.

U.S. Pat. No. 3,966,842, to Ludwig et al., discloses thermoplastic compositions comprising a minor proportion (12 to 40 weight percent) of a polycarbonate resin and a predominant amount of a rubber-reinforced styrene/maleic anhydride polymer. The resulting polyblend is disclosed as having improved impact strength as compared with the rubber-reinforced styrene/maleic anhydride resin. Ludwig et al. may be distinguished from the instant invention since (1) the Ludwig et al. patent is limited to polycarbonate resins which are devoid of the aryl linkages present in the aromatic polyester resins employed herein, and (2) the Ludwig et al. patent is not directed to overcoming the problem of hydrolytic stability associated with such polyesters. Accordingly, Ludwig et al. is not deemed pertinent to the subject matter of this invention, which is more fully described as set forth herein.

SUMMARY OF THE INVENTION

It has now been found that polyester molding compositions having improved hydrolytic stability may be prepared by blending a linear aromatic polyester with a polymer comprising the reaction product of a styrene/maleic anhydride copolymer and a diene rubber. The preferred aromatic polyesters of this invention, are prepared from bisphenols and at least one aromatic dicarboxylic acid, most preferably selected from the group consisting of isophthalic acid, terephthalic acid, or mixtures thereof.

DESCRIPTION OF THE PREFERRED EMBODIMENTS

The linear aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

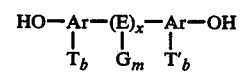

wherein Ar is aromatic, preferably containing 6–18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, and halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—, GP<=O or GN<; T and T' are independently selected from 0 to the number of replaceable hydrogen atoms on E; b is an integer from 0 to the number of replaceable hydrogen atoms on Ar, and x is 0 or 1. When there is a plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene or 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2- hydroxyphenyl)methane, 4-hydroxyphenyl, 2-hydroxyphenyl methane and mixtures thereof; bis(3-methyl-4-hydroxyphenyl)methane, bis(4-hydroxy-3,5-dichlorophenyl)methane, bis(4-hydroxy-3,5-dibromophenyl)methane, bis(4-hydroxy-3,5-difluorophenyl)methane, bisphenol-A[bis-(4-hydroxyphenyl)-2,2-propane], bis(3-chloro-4-hydroxyphenyl)-2,2-propane, bis(4-hydroxy-3,5-dichlorophenyl)-2,2-propane, bis(4-hyroxynaphthyl)-2,2-propane, bis(4-hydroxyphenyl)phenyl methane, bis(4-hydroxyphenyl)diphenyl methane, bis(4-hydroxyphenyl)-4'-methyl phenyl methane, bis(4-hydroxyphenyl)-4'-chlorophenyl methane, bis(4-hydroxyphenyl)2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthylenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-terbutylphenyl)-2,2-propane, bis(4-hydroxyphenyl-1-phenyl-1,1,ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)-propane; 4,4'-(cyclohexymethylene) bis(2,6-dichlorophenol); 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis(3,5-dibromo-4-hydroxyphenyl)-hexane, 4,4'-dihydroxy-3,3',5,5'-tetrachlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propene, tetrachlorodiphenylolsulfone, bis(3,5-dibromo-4-hydroxyphenyl)-phenyl phosphine oxide, bis(3,5-dibromo-4-hydroxyphenyl)-sulfoxide, bis(3,5-dibromo-4-hydroxyphenyl)-sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4,4'-hydroxy biphenyl. Representative biphenols are o,o-biphenol, m,m'-biphenol; p,p'-biphenol; bicresols, such as 4,4'-bi-o-cresol,6,6-bi-o-cresol, 4,4'-bi-m-cresol; dibenzyl biphenols such as a,a'-diphenol-4,4'-bi-o-cresol; diethyl biphenols such as 2,2'-diethyl-p,p;-biphenol, and 5,5'-diethyl-o,o'-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol. Mixtures of isomers of the foregoing bisphenols can also be used.

The dicarboxylic acids which are useful in this process are also well known and can be represented by the formula:

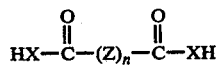

in which X is oxygen or sulfur, Z is alkylene, —Ar— or —Ar—Y—Ar— where Ar has the same definition as given with respect to the bisphenols, Y is alkylene, of 1 to 10 carbons, haloalkylene, —O—, —S—, —SO—, —SO$_2$—, —SO$_3$—, —CO—, GP$<$=O or GN$<$, n is 0 or 1, and G has the same definition as given with respect to the bisphenols.

Suitable dicarboxylic acids include aromatic dicarboxylic acids such as phthalic acid, isophthalic acid, terephthalic acid, bis(4-carboxyl)-diphenyl, bis(4-carboxyphenyl)-ether, bis(4-carboxyphenyl)-sulfone, bis(4-carboxyphenyl)-carbonyl, bis(4-carboxyphenyl)-methane, bis(4-carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1,1-dimethyl propane, 1,1- and 2,2-bis(4-carboxyphenyl)-butane,1,1- and 2,2-bis (4-carboxyphenyl)-pentane, 3,3-bis-(4-carboxyphenyl)-heptane, 3,3-bis(3-carboxyphenyl)-heptane, and aliphatic acids such as oxalic acid, adipic acid, succinic acid, malonic acid, sebacic acid, glutaric acid, azelaic, suberic acid and the like. Isophthalic acid and terephthalic acid are preferred due to their availability and low cost. Most preferably, the dicarboxylic acid component comprises a mixture of about 75 to about 100 mol percent isophthalic acid and about 25 to about 0 mol percent terephthalic acid.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. correspond to those described above. The aliphatic modifier is a reactive difunctional component which may be represented by the formula:

$$H_nD - A - D'H_n$$

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylenecarboxyalkylenecarboxy) alkyl; and n is an integer from 1 to 2 with n being 2 when D or D'is N. Typical examples of aliphatic modifiers having the foregoing formula include ethylene glycol, diethylene glycol, neopentyl glycol, 1,4-cyclohexane, dimethanol, 1,4-butane dithiol, dipropylene glycol, polypropylene glycol, 1,1-isopropylidenebis(p-phenyleneoxy)di-2-ethanol, 2,2,4,4-tetramethyl-1,3-cyclobutanediol, bis(4-hydroxycyclohexane)-2,2-propane, di(hydroxyethyl) adipate, di(hydroxypropyl) glutarate, di(hydroxyethyl)poly(ethylene glycol) adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

A further process which can be used to prepare linear aromatic polyesters suitable for use in this invention is described and claimed in copending application Ser. No. 8;8,493, filed July 25, 1977. This process basically comprises first mixing a bisphenol, a diaryl ester of a dicarboxylic acid, and an oligomer of a dicarboxylic acid and a diol, and then reacting the resulting mixture in the presence of a transesterification catalyst. The disclosure of this application is incorporated herein by reference.

Solution processes can also be employed in the preparation of suitable aromatic polyesters, such as disclosed in U.S. Pat. No. 4,051,106, to Pawlak et al. and U.S. Pat. No. 4,051,107, to Gouinlock et al., the disclosures of which are incorporated herein by reference.

Additional processes which can be employed in the instant invention include the ester-interchange reaction between a diaryl ester of a dicarboxylic acid and a diphenolic compound such as described in British Pat. No. 924,607, to Imperial Chemical Industries Limited, the disclosure of which is incorporated herein by reference.

The rubber-modified copolymer of this invention comprises broadly the polymerization reaction product of (a) a monovinyl alkenyl aromatic monomer containing up to 12 carbon atoms and having the alkenyl group attached directly to the benzene neuclus, the alkenyl aromatic compound being present in a proportion of from about 65 to about 85 parts by weight based on 100 parts by weight of copolymer, and from about 10 to about 35 parts by weight based on 100 parts by weight of copolymer of an unsaturated dicarboxylic anhydride readily copolymerizable therewith, and (b) from about 5 to about 35 parts by weight (and beneficially from about 10 to about 25 parts by weight) of a rubber per 100 parts by weight of copolymer, the rubber being in the form of a plurality of particles having diameters within the range of 0.02 to 30 microns (and beneficially from 0.1 to 10 microns) dispersed throughout a matrix of copolymer of the alkenyl aromatic monomer and the anhydride, at least a major portion of the rubber particles containing occlusions of the polymerization product of (a). Preferably, a diene rubber will be used, and, most preferably, a homopolymer of butadiene.

The preparation of the above-described copolymeric composition is illustrated in U.S. Pat. No. 3,919,354, to Moore et al., the disclosure of which is incorporated herein by reference. Suitable compositions are manufactured by the Dow Chemical Company and designated as Dow Experimental Resin XP-5272.00.

The novel resin compositions of the instant inventin are prepared by blending the linear aromatic copolyester with the rubber-modified copolymer. The blending or mixing process can be performed using conventional mixing equipment such as, for example, a Banbury mixer, mixing roll, kneader, screw extruder, or injection molding machine. Although the mixing ratio may vary depending on the physical properties desired in the resultant polymer blend, the copolymer is present preferably in an amount of about 5 parts to about 95 parts by weight of blended polymer, and most preferably, in an amount of about 10 parts to about 30 parts by weight of polyblend.

The novel polymer compositions of the present invention may also include various additives such as inorganic fillers, stabilizers, antistatic agents, flame retardants, clay, talc, alumina, magnesium, calcium carbonate and organic or inorganic fibers such as glass fibers. Suitable flame retardants, such as halogen-containing Diels-Alder adducts, are disclosed in applicant's copending applications, Ser. Nos. 863,556 filed 12/22/77, and 863,381, filed 12/22/77, of even date herewith, the pertinent disclosure of which is incorporated herein by reference. The resultant mixture may be blended, if desired, with glass fibers in a conventional mixing apparatus, such as a premix mixer or melt extruder, advantageously in an amount of about 10 to about 40 parts by weight based on 100 parts by weight of molding composition. The filled or unfilled compositions can then be molded directly in an injection molding apparatus or an extruder. The molded articles thus formed have excellent hydrolytic stability and tensile strength.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1 PREPARATION OF LINEAR AROMATIC POLYESTER

A mixture of 165.7 parts isophthaloyl chloride, 29.2 parts terephthaloyl chloride, and 216.7 parts bisphenol-A (2,2-bis(4-hydroxyphenol) propane) was dissolved in 2270 parts methylene chloride (having a moisture content of 10 ppm of water) in a reactor at 25° C. 200.7 parts triethyl amine was added at a constant rate to the reaction mixture over a period of 4.4 hours, under nitrogen purge with stirring. The reaction mixture was maintained at 15° C. After completion of the triethylamine addition, the mixture was stirred for 3 hours at 20° C. 6.8 parts of benzoyl chloride was then added to react with the end-groups of the polymer. After one hour, 13.7 parts isopropanol was added to react with any excess benzoyl chloride. Dilute aqueous hydrogen chloride (570 parts of a 0.5 wt. % sol.) was added to react with any excess triethylamine for an additional one hour with stirring. The two phases were then allowed to separate by gravity, and the water phase was removed. Additional washes of the polymer solution with equal amounts of water were carried out until the chloride ion in the polymer solution measured less than 0.1 ppm. The polymer was then precipitated from solution and dried in a vacuum oven until the moisture concentration was less than 0.1 wt. %. The resultant polymer had an intrinsic viscosity of 0.54 dl/g in symmetrical tetrachloroethane (at 30° C.).

EXAMPLE 2 PREPARATION OF MOLDING COMPOSITION

A linear aromatic polyester was prepared according to the procedure of Example 1 and dried for four hours at 120° C. 100 parts of a polymer of styrene, maleic anhydride, and butadiene (Dow Experimental Resin XP-5272.08), in a weight ratio of 57.5/21/21.5, respectively, having a melt flow index of 5.92 grams measured over a 10 minute interval using a 12 Kg. weight at 265° C. according to ASTM test procedures, was blended with 400 parts of polyester on a two roll Farrell Mill (front roll heated to 450° F., back roll heated to 410° F.) at 35 r.p.m. The blend was sheeted and ground to 4 m.m. size granules on a granular. The granules were dried for 2–4 hours at 120° C. and injection molded to produce tensile and flex bars. The injection molding conditions were as follows:

MOLDING PARAMETERS

| Barrel Temperature (° F) | 550 |
|---|---|
| Mold Temperature (° F) | 250 |
| Injection Pressure (psi) | 13,300 |

PHYSICAL PROPERTIES

|  | Example 2 | Control |
|---|---|---|
| Tensile Strength (psi) | 8,900 | 10,000 |
| Tensile Modulus (psi × $10^5$) | 2.86 | 3.34 |
| After 7 days immersion in boiling $H_2O$: |  |  |
| Tensile Strength (psi) | 9,600 | 1,700 |
| Tensile Modulus (psi × $10^5$) | 3.68 | 2.75 |

EXAMPLE 3

PREPARATION OF MOLDING COMPOUND

The procedure of Example 2 was repeated using 120 parts of the styrene/maleic anhydride/butadiene polymer and 480 parts of polyester to prepare tensile bars under the following conditions:

MOLDING PARAMETERS

| Barrel Temperature (° F) | 550 |
|---|---|
| Mold Temperature (° F) | 250 |
| Injection Pressure (psi) | 16,600 |

The tensile bars thus prepared were found to have the following characteristics:

PHYSICAL PROPERTIES

| Tensile Strength (psi) | 9,000 |
|---|---|
| Tensile Modulus (psi × $10^5$) | 3.09 |
| After 7 days immersion in boiling $H_2O$: |  |
| Tensile Strength (psi) | 9,500 |
| Tensile Modulus (psi × $10^5$) | 3.96 |

EXAMPLE 4 PREPARATION OF MOLDING COMPOSITION

The procedure of Example 2 was again repeated using 60 parts of the styrene/maleic anhydride/butadiene polymer and 540 parts of polyester to prepare tensile bars under the following conditions:

MOLDING PARAMETERS

| Barrel Temperature (° F) | 570 |
|---|---|
| Mold Temperature (° F) | 250 |
| Injection Pressure (psi) | 20,000 |

The tensile bars thus prepared were found to have the following characteristics:

PHYSICAL PROPERTIES

| Tensile Strength (psi) | 9,600 |
|---|---|
| Tensile Modulus (psi × $10^5$) | 3.02 |
| After 7 days immersion in boiling $H_2O$: |  |
| Tensile Strength (psi) | 10,200 |
| Tensile Modulus (× $10^5$) | 3.63 |

These examples demonstrate the improvements in hydrolytic stability achieved as a result of the polymer blends of this invention.

We claim:

1. A thermoplastic polymeric molding composition comprising, in admixture, (a) a linear aromatic polyester of components comprising a bisphenol and a dicarboxylic acid, where said carboxylic acid has the formula:

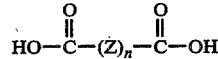

wherein Z is alkylene, —Ar or —Ar—Y—Ar—, where Ar is aromatic, Y is alkylene, haloalkylene, —O—, —S—, —SO—, —$SO_2$—, —$SO_3$—, —CO, GP<=O or GN<$n$ is 0 or 1, and G is alkyl, haloalkyl, aryl, haloaryl, alkylaryl, haloalkylaryl, arylalkyl, haloarylalkyl, cycloalkyl, and halocycloalkyl, and (b) a rubber-modified copolymer comprising the reaction product of (1) a monovinyl alkenyl aromatic monomer containing up to 12 carbon atoms and having the alkenyl group attached directly to the benzene nucleus, said alkenyl aromatic compound being present in a proportion of from about 65 to about 85 parts by weight based on 100 parts by weight of said rubber-modified copolymer, and from about 10 to about 35 parts by weight of an unsaturated dicarboxylic anhydride readily copolymerizable therewith, and (2) from about 5 to about 35 parts by weight of a rubber in the form of a plurality of particles having diameters within the range of 0.02 to 30 microns dispersed throughout a matrix of the polymer of (1), at least a major portion of the rubber particles containing occlusions of the polymerization product of (1).

2. The composition of claim 1 wherein the monovinyl monomer is styrene.

3. The composition of claim 1 wherein the unsaturated dicarboxylic anhydride is maleic anhydride.

4. The composition of claim 1 wherein the rubber is polybutadiene.

5. The composition of claim 1 wherein said dicarboxylic acid is an aromatic dicarboxylic acid.

6. The composition of claim 5 wherein said aromatic dicarboxylic acid is selected from the group consisting of isophthalic acid, terephthalic acid, and mixtures thereof.

7. The composition of claim 1 wherein said bisphenol has the formula:

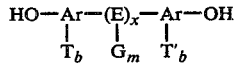

wherein Ar is aromatic, G is alkyl, haloalkyl, aryl, haloaryl, alkylaryl, haloalkylaryl, arylalkyl, haloarylalkyl, cycloalkyl, and cyclohaloalkyl; E is divalent alkylene, haloalkylene, cycloalkylene, halocycloalkylene, arylene, or haloarylene, —O—, —S—, —SO—, —$SO_2$—, —$SO_3$—, —CO—, GP<=O or GN<; T and T' are independently selected from the group of halogen, G or OG; $m$ is an integer from 0 to the number of replaceable hydrogen atoms on E; $b$ is an integer from 0 to the number of replaceable hydrogen atoms on Ar, and $x$ is 0 or 1.

8. The composition of claim 7 wherein the bisphenol is bisphenol-A.

9. The composition of claim 1 wherein said linear aromatic polyester includes an aliphatic modifier.

10. The composition of claim 9 wherein said aliphatic modifier is a glycol of 2 to about 100 carbon atoms.

11. The composition of claim 10 wherein said glycol is selected from the group consisting of neopentyl glycol, diethylene glycol, ethylene glycol, and mixtures thereof.

12. The composition of claim 1 which also includes a filler material.

13. The composition of claim 12 wherein said filler material is glass fiber present in an amount of about 10 to about 40 parts by weight based on 100 parts by weight of molding composition.

14. The composition of claim 1 wherein said rubber-modified copolymer is present in an amount of from about 5 to about 95 parts by weight based on 100 parts by weight of admixture.

15. The composition of claim 14 wherein said rubber-modified copolymer is present in an amount of from about 10 to about 30 parts by weight based on 100 parts by weight of admixture.

16. A molded article formed from the composition of claim 1.